US010603756B2

(12) United States Patent
Pan et al.

(10) Patent No.: US 10,603,756 B2
(45) Date of Patent: Mar. 31, 2020

(54) SCULPTURED DRUM FOR GROOVE SUPPORT IN RETREAD FINISHING

(71) Applicant: Compagnie Generale des Etablissements Michelin, Clermont-Ferrand (FR)

(72) Inventors: Chinglin Pan, Mauldin, SC (US); Mike Leon Burgess, Easley, SC (US)

(73) Assignee: Compagnie Generale Des Etablissements Michelin, Clermont-Ferrand (FR)

(*) Notice: Subject to any disclaimer, the term of this patent is extended or adjusted under 35 U.S.C. 154(b) by 63 days.

(21) Appl. No.: 16/081,656

(22) PCT Filed: Mar. 20, 2017

(86) PCT No.: PCT/US2017/023182
§ 371 (c)(1),
(2) Date: Aug. 31, 2018

(87) PCT Pub. No.: WO2017/172400
PCT Pub. Date: Oct. 5, 2017

(65) Prior Publication Data
US 2019/0061090 A1 Feb. 28, 2019

Related U.S. Application Data

(63) Continuation of application No. PCT/US2016/025232, filed on Mar. 31, 2016.

(51) Int. Cl.
B25B 11/00 (2006.01)
B24B 5/36 (2006.01)
(Continued)

(52) U.S. Cl.
CPC ............ B24B 5/366 (2013.01); B24B 5/50 (2013.01); B24B 41/06 (2013.01); B29D 30/52 (2013.01);
(Continued)

(58) Field of Classification Search
CPC ........... B25B 11/00; B25B 11/02; B23Q 1/25; B23Q 1/262; B23Q 3/00; B23Q 3/005
See application file for complete search history.

(56) References Cited

U.S. PATENT DOCUMENTS 2,107,051 A * 2/1938 Briney .................. B24B 5/35
451/242
3,918,697 A * 11/1975 Gregory ............ B23K 37/0538
269/289 R (Continued)

FOREIGN PATENT DOCUMENTS

JP H05116235 A 10/2001

OTHER PUBLICATIONS

European Patent Office; International Search Report and Written Opinion for patent application PCT/US2017/023182; dated May 2, 2017; Publisher: European Patent Office, Rijswijk, Netherlands, pp. 1-9, enclosed.

(Continued)

Primary Examiner — Lee D Wilson
(74) Attorney, Agent, or Firm — Neal P. Pierotti

(57) ABSTRACT

A sculptured drum for a retread process that has an inner radial section with a central axis that extends in an axial direction. The sculptured drum has a plurality of support members that extend outward from a drum outer surface in a radial direction and that are located outward from the inner radial section in the radial direction. A tread that has a plurality of grooves is supported by the sculptured drum during a brushing process and pass across the sculptured (Continued)

drum such that some but not all of the grooves have one of the support members disposed therein. The support members when disposed within the grooves do not completely fill the grooves, and when disposed within the grooves engage a lower surface of the tread.

12 Claims, 7 Drawing Sheets

(51) Int. Cl.
 B24B 41/06 (2012.01)
 B29D 30/56 (2006.01)
 B24B 5/50 (2006.01)
 B29D 30/52 (2006.01)
 B29D 30/54 (2006.01)
(52) U.S. Cl.
 CPC ............ B29D 30/54 (2013.01); B29D 30/56 (2013.01); B29D 2030/541 (2013.01)

(56) References Cited

U.S. PATENT DOCUMENTS

| 2003/0015917 | A1* | 1/2003 | Yovichin | B29D 29/085 |
| | | | | 305/165 |
| 2010/0323583 | A1* | 12/2010 | Hetzel | B29D 30/52 |
| | | | | 451/28 |
| 2016/0221288 | A1* | 8/2016 | Zarak | B29D 30/54 |
| 2019/0061090 | A1* | 2/2019 | Pan | B24B 41/06 |

OTHER PUBLICATIONS

European Patent Office; International Search Report and Written Opinion for patent application PCT/US2016/025232; dated Dec. 15, 2016; Publisher: European Patent Office, Rijswijk, Netherlands, pp. 1-10, enclosed.

* cited by examiner

SCULPTURED DRUM FOR GROOVE SUPPORT IN RETREAD FINISHING

CROSS-REFERENCE TO RELATED APPLICATIONS

The present application is a 35 U.S.C. § 371 application of PCT/US17/23182 filed on Mar. 20, 2017 and entitled "Sculptured Drum for Groove Support in Retread Finishing." PCT/US17/23182 claims the benefit of PCT/US16/25232 filed on Mar. 31, 2016 and entitled "Sculptured Drum for Groove Support in Retread Finishing." PCT/US17/23182 and PCT/US16/25232 are both incorporated by reference herein in their entireties for all purposes.

FIELD OF THE INVENTION

The present invention relates generally to a sculptured drum that supports tread that is being brushed in a retread finishing process. More particularly, the present application involves a sculptured drum with support members that are located within grooves of the tread, but do not completely fill the grooves of the tread, during a brushing of the underside surface of the tread in a retread process.

BACKGROUND

The retreading of tires involves the molding of a new section of tread that has a tread surface and an underside surface opposite from the tread surface. In order to attach the underside surface to the tire carcass that is being reused, the underside surface must be brushed to prepare the surface for attachment. The tread section is provided in the form of a longitudinal strip, and an end of the strip is held while the strip is fed into a brush machine. FIG. 1 shows the underside surface 30 of a tread 12 that is engaged by and is being treated by a brush 14. A roller 70 supports the tread 12 as the tread 12 is being brushed. A tread surface 32 of the tread 12 opposite the underside surface 30 engages the roller 70, and the tread 12 engages surfaces on the brush 14 and roller 70 that are both convex in shape. Tread 12 can have various patterns and in some instances may have large open tread blocks. Upon going through the nip created by the brush 14 and roller 70 in the machine direction 40, the leading edge 72 of the tread block 32 is brushed and the tread block 32 tilts upwards. As the tread block 32 moves past the brush 14, the trailing edge 74 of the tread block 32 is pinched by the brush 14 and the roller 70 and the tread block 32 tilts downward. As the tread block 32 is bending at irregular angles through the pinch point of the brush 14 and roller 70, an irregular contact patch is created on the tread block 32 under the brushing force.

The rigidity difference in the tread 12 between the tread blocks 32 and the grooves 26 of the tread 12 will cause the tread 12 to deform differently under the brushing force and feeding force of the tread 12 past the brush 14. This rigidity difference will also cause irregularities in the process due to the bending of the tread 12 along the roller. Through the various factors, the large open block tread 32 will experience irregular movement when being fed past the brush 14 which will cause irregularity in the brushing of the tread 12.

With reference to FIG. 2, the underside surface 30 of the tread 12 is shown after being brushed by the brush 14. Due to the irregular movement via the factors discussed above, the leading edges 72 of the tread blocks 32 will have over brushed areas that can include dig in notches 76 formed by the brush 36 on the underside surface 26. The trailing edges 108 of the tread blocks 54 will have various under brushed spots 78. These under brushed spots 78 must be manually reworked, which is ergonomically unfriendly, and results in additional labor and costs.

A structure with the exact same shape and size as the grooves 26 can be used to restrict the movement of the tread 12 when being brushed. Here, the structure can be formed from a mold of the tread 12 so that it exactly matches the grooves 26 and fills all of the grooves 26 and is located inside of the grooves 26 when the underside surface 30 is being brushed to completely fill up the grooves 26. The structure will support the tread 12 during brushing in order to prevent the tread 12 from moving around and causing irregularities in the brushing process. However, this method requires a large amount of force be applied to move the grooves 26 into and out of the structure due to the tight engagement. The structure and thus the tooling must be dedicated to that particular type and size of tread 12, which increases the amount of tooling needed for various treads 12, increases the production cost and time necessary to brush. Also, the increased amount of tooling must be changed out when different treads 12 are treated and this change out again increases production time and cost. As such, there remains room for variation and improvement within the art.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended Figs. in which.

Figure 1:
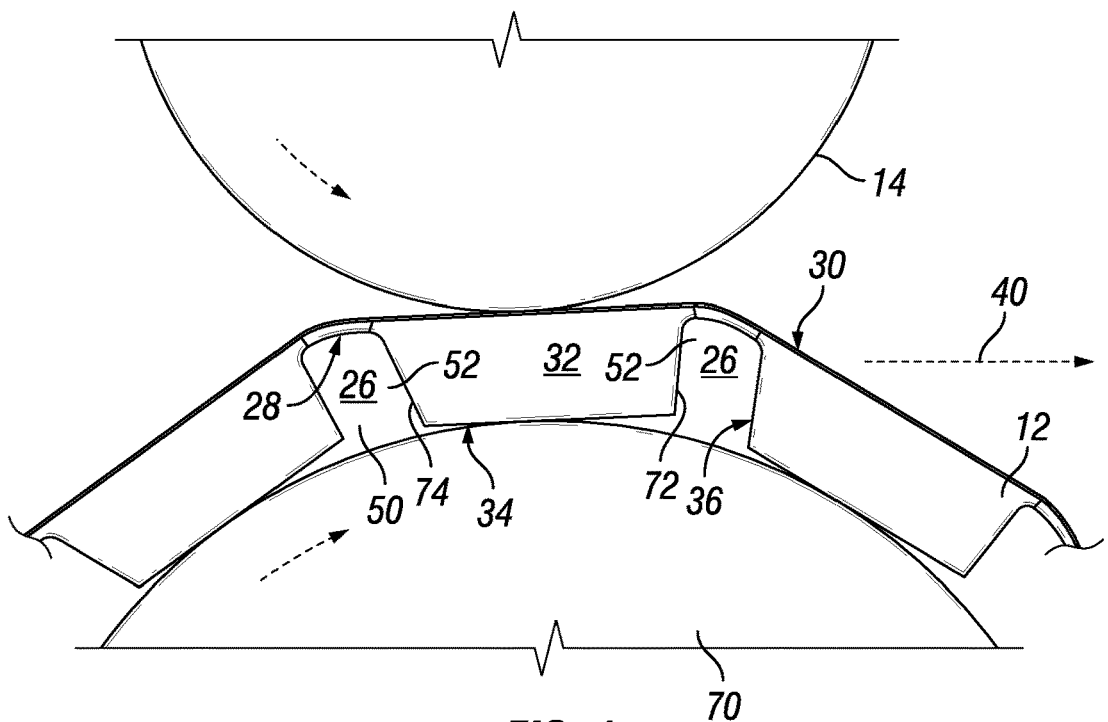
FIG. 1 is a side view of tread passing through a roller and brush in accordance with the prior art.
Figure 2:
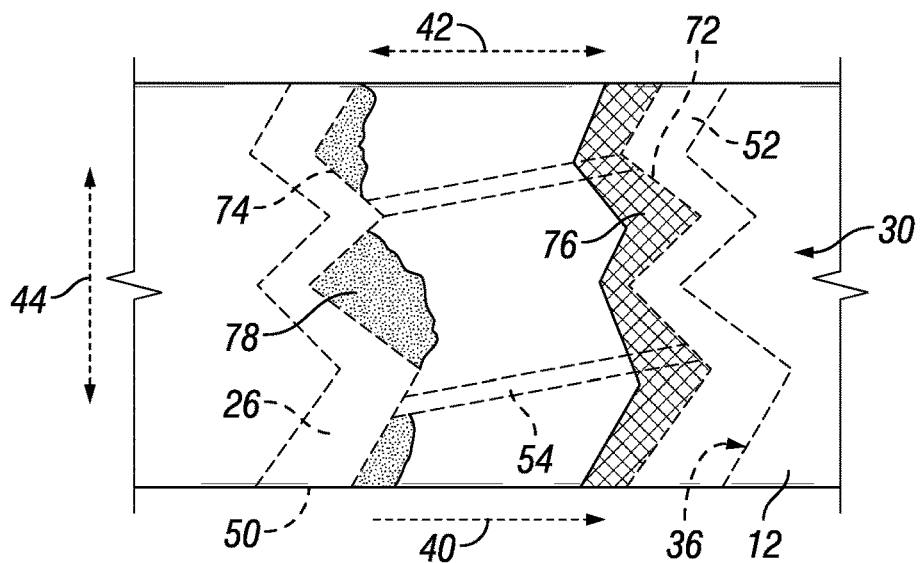
FIG. 2 is a top view of the underside surface of the tread that has passed through the brush and roller arrangement of FIG. 1.

Repeat use of reference characters in the present specification and drawings is intended to represent the same or analogous features or elements of the invention.

DETAILED DESCRIPTION OF REPRESENTATIVE EMBODIMENTS

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

It is to be understood that the ranges mentioned herein include all ranges located within the prescribed range. As such, all ranges mentioned herein include all sub-ranges included in the mentioned ranges. For instance, a range from 100-200 also includes ranges from 110-150, 170-190, and 153-162. Further, all limits mentioned herein include all other limits included in the mentioned limits. For instance, a limit of up to 7 also includes a limit of up to 5, up to 3, and up to 4.5.

The present invention provides for a sculptured drum 10 that limits unwanted movement of the tread blocks 32 during the brushing operation to result in a more uniformly and desired brushing of the underside surface 30 of the tread 12. The problem of unwanted movement is especially seen with large, open tread blocks 32 and the sculptured drum 10 functions to contain or regulate this tread block 32 movement. The sculptured drum 10 features a plurality of support members 22 that are positioned into the grooves 26 of the tread 12 when the tread 12 is between the sculptured drum 10 and the brush 14 and is being brushed. The support members 22 do not completely fill the grooves 26 but only partially fill the grooves 26. However, the support members 22 do engage the lower surface 28 of the tread 12 and function to support the tread 12 when it is being brushed so that bending and movement is limited. This support reduces or eliminates the formation of dig in notches 76 and under brushed spots 78. The support members 22 may be located in all of the grooves 26, or may be located in less than all of the grooves 26 so that various grooves 26 do not have any support members 22 positioned therein. The support members 22 may be located in the larger grooves 26 but not the smaller grooves 26, and/or may be located in the lateral grooves 52 of the tread 12 but not in the circumferential grooves 54. By having the support members 22 fill up some, but not all, of the tread 12 makes it easier for the tread 12 to be placed onto and removed from the sculptured drum 10. The sculptured drum 10 results in better support of the tread 12 to eliminate unwanted movement and improve finishing.

Figure 3:
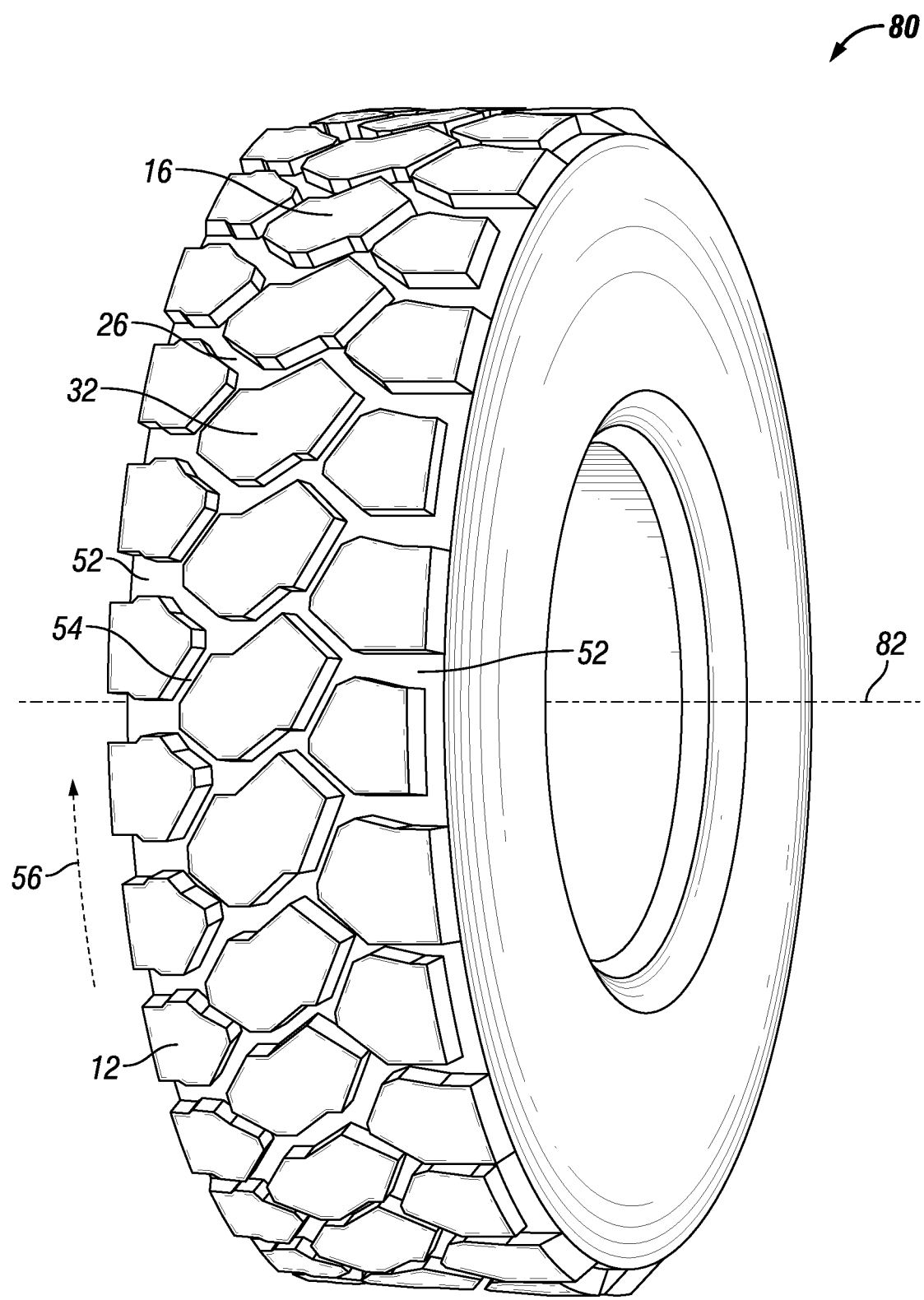
FIG. 3 is a perspective view of a tire.

With reference to FIG. 3, a tire 80 in accordance with one exemplary embodiment is shown. The tire 80 rotates about a rotational axis 82, and the tread 12 of the tire 80 is spaced from the rotational axis 82 in a radial direction of the tire 80. The tread 12 extends 360 degrees around the rotational axis 82 in the circumferential direction 56 of the tire 80. In other designs, the circumferential grooves 54 do not extend all the way around the tire 360 degrees in the circumferential direction 56 but extend less than all the way around the tire 80. The tread 12 includes a series of grooves 26 some of which are circumferential grooves 54 that extend 360 degrees around the rotational axis 82 in the circumferential direction 56. The circumferential grooves 54 separate the tread 12 into a series of tread blocks 32 that are located between the circumferential grooves 54 in the axial direction. The tread 12 also includes grooves 26 that are lateral grooves 52 in that they extend in the axial direction more so than in the circumferential direction 56. The lateral grooves 52 may also function to define the tread blocks 32 in some arrangements, such as those tread blocks 32 on the shoulders, and the lateral grooves 52 may extend the entire width of the tire 80 in the axial direction, or may extend less than the entire width of the tire 80. Tread 12 may include sipes 38 in the tread blocks 32. The sipes 38 are shown running in a zig-zag fashion generally in the axial direction, but may be variously arranged in that they may extend at an angle to the axial direction so as to have some component of extension in the axial direction and some component of extension in the circumferential direction 56. The shapes, sizes, and orientations of the sipes can be variously arranged in accordance with different exemplary embodiments.

Figure 4:
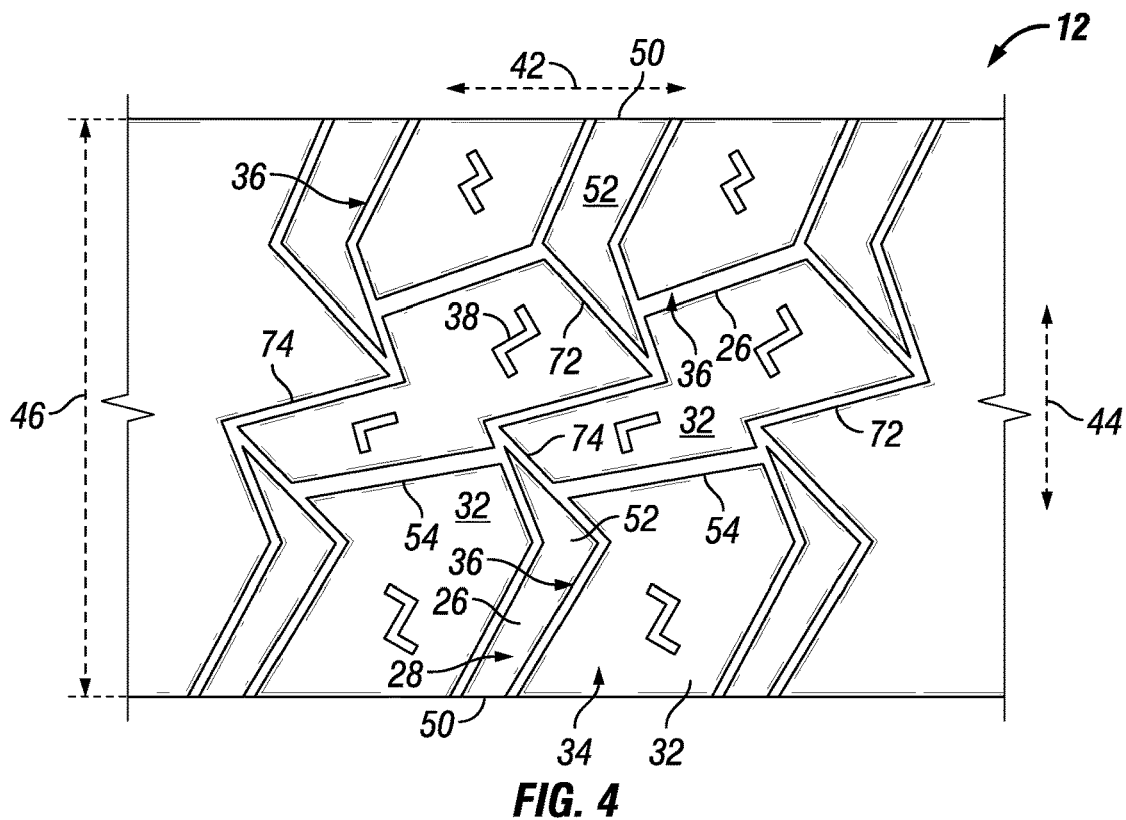
FIG. 4 is a top view of tread.

A different tread 12 design is shown in FIG. 4 in which large, open tread blocks 32 are present in the tread 12. The tread 12 is shown not incorporated into a tire 80, but instead is shown as a linear strip that is to be treated by the brush 14 in a brushing stage of a retreading process. Once brushed, the tread 12 will ultimately be placed onto the tire 80 as previously described and shown in FIG. 3. The tread 12 has a series of tread blocks 32 that have tread block walls 36 that define there between grooves 26. The grooves 26 are also defined by the lower surface 28 of the tread 12 from which the tread blocks 32 extend. The tread blocks 32 can be variously shaped, and it is to be understood that the shapes and sizes illustrated are only exemplary and that others are possible. Likewise, the grooves 26 defined between the tread blocks 32 can be variously shaped and it is to be understood that they need not be sized and shaped the same way as in the figures.

The grooves 26 include those that are lateral grooves 52 and those that are circumferential grooves 54. The lateral grooves 52 have a longer length in the lateral direction 44 than in the longitudinal direction 42. The circumferential grooves 54 have a longer length in the longitudinal direction 42 than in the lateral direction 44. In other embodiments, grooves 26 can be provide so that their lengths are the same in both the longitudinal direction 42 and the lateral direction 44. The lateral grooves 52 as shown are larger than the circumferential grooves 54 so that they have a larger volume than the circumferential grooves 54. The circumferential grooves 54 are contained within the tread 12 so that they closed and defined completely by the tread lower surface 28 and the tread block walls 36. The lateral grooves 52 are open grooves in that they are defined by the tread lower surface 28 and the tread block walls 36, but also have open ends 50 that are at the lateral edges of the tread 12. In other embodiments, the lateral grooves 52 may be closed, and the circumferential grooves 54 may be open.

The tread block walls 36 may be straight up and down from the lower surface 28 to the tread block outer surface 34. However, the lateral grooves 52 have tapered tread block walls 36 so that the lateral grooves 52 are narrower at the lower surface 28 and wider at the tread block outer surface 34. The tapered tread block walls 36 may allow the tread 12 to be more easily removed from the mold into which it is formed. The circumferential grooves 54 are shown as having straight tread block walls 36, but they can be tapered in other embodiments. The circumferential grooves 54 open up into the lateral grooves 52 so that a series of grooves 26 that are connected is defined on the tread 12. However, in other arrangements the grooves 26 can be separate or connected as desired. A number of sipes 38 may be present on the tread 12 and are located within the tread blocks 32 and extend into the tread blocks 32 from the tread block outer surface 34. The sipes 38 may extend all the way to the lower surface 28 or may stop short of this feature. The sipes 38 do not have open ends, but in other arrangements could be located near the shoulders of the tread 12 so that the sipes 38 are open. The sipes 38 can extend primarily either in the longitudinal direction 42 or the lateral direction 44. The sipes 38 are differentiated from the lateral grooves 52 in that the sipes 38 are smaller in width than the lateral grooves 52. The sipes 38 may not have a width over 1 or 2 millimeters in certain exemplary embodiments, while the widths of the lateral grooves 52 are larger than 2 millimeters.

Figure 5:
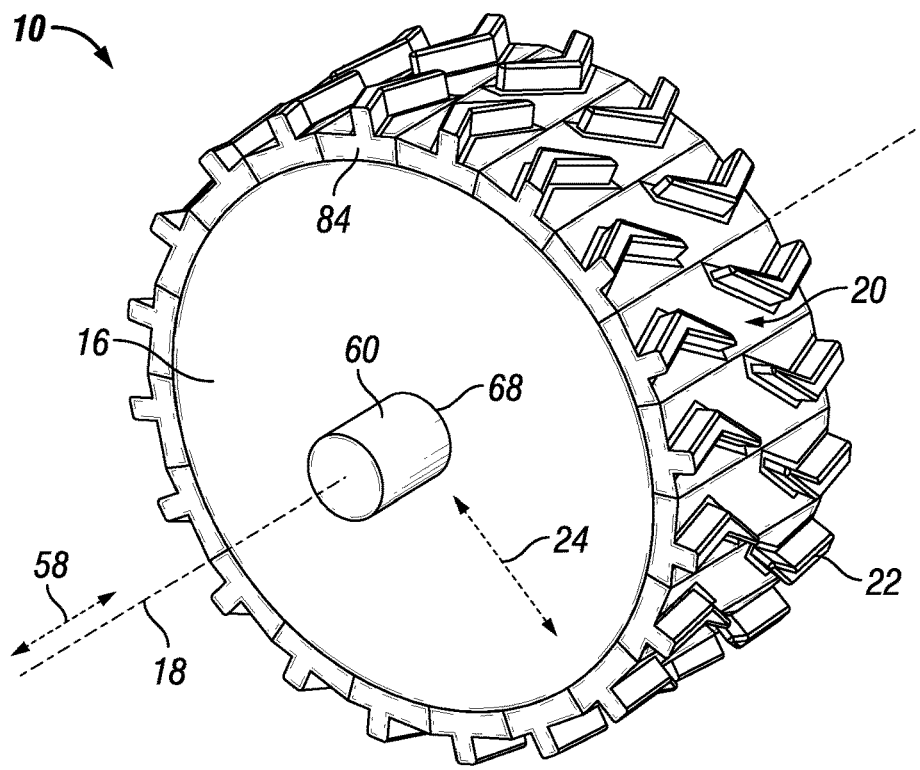
FIG. 5 is a perspective view of a sculptured drum in accordance with one exemplary embodiment.

One exemplary embodiment of the sculptured drum 10 is shown with reference of FIG. 5. The sculptured drum 10 has an inner radial section 16 that defines a through hole 68. A shaft 60 is disposed through the through hole 68 and the sculptured drum 10 may rotate about a central axis 18 of the inner radial section 16. The shaft 60 may be permanently attached to the inner radial section 16, or the inner radial section 16 may be releasably attachable to the shaft 60 so that the position of the inner radial section 16 along the shaft 60 can be adjusted. The inner radial section 16 is shown as being a solid component but may have spokes or voids in other arrangements.

A series of segments 84 are located outward from the inner radial section 16 in the radial direction 24. The segments 84 can be the same size as one another and are located 360 degrees around the inner radial section 16. The segments 84 define a drum outer surface 20. The segments 84 include a plurality of support members 22 that extend outward from the drum outer surface 20 in the radial direction 24. The support members 22 are integrally formed with the segments 84. In other arrangements, the segments 84 are not present and instead the support members 22 are integrally formed with the inner radial section 16 which also defines the drum outer surface 20. Although 40 support members 22 are illustrated, any number of support members 22 can be present in other exemplary embodiments. For instance, from 20-30, from 30-40, from 40-50, from 50-60, or up to 80 support members 22 may be present in the sculptured drum 10 in other arrangements.

Figure 6:
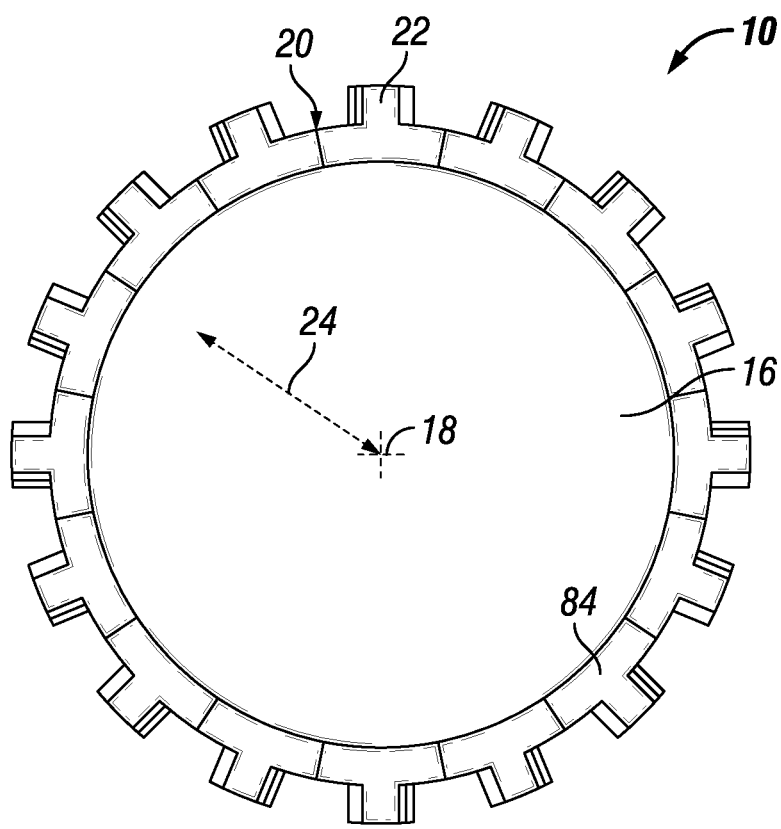
FIG. 6 is a side view of a sculptured drum in accordance with another exemplary embodiment.

A side view of the sculptured drum 10 is shown in FIG. 6 and is substantially similar to the sculptured drum 10 of FIG. 5. The sculptured drum 10 in FIG. 6 has 16 segments 84 as opposed to the 20 segments 84 present in the sculptured drum 10 of FIG. 5. Any number of segments 84 may be present in other exemplary embodiments. For instance, from 0-4, from 4-16, from 16-32, or up to 52 segments 84 can be present. The segments 84 may have the same arc length as one another so that they are all evenly spaced and sized about the central axis 18. Although shown as including a pair of support members 22, any number of support members 22 can be incorporated into the segments 84 depending upon the desired support sequence and geometry of the tread 12. The diameter of the drum outer surface 20 may be from 360-800 millimeters in certain exemplary embodiments.

Figure 7:
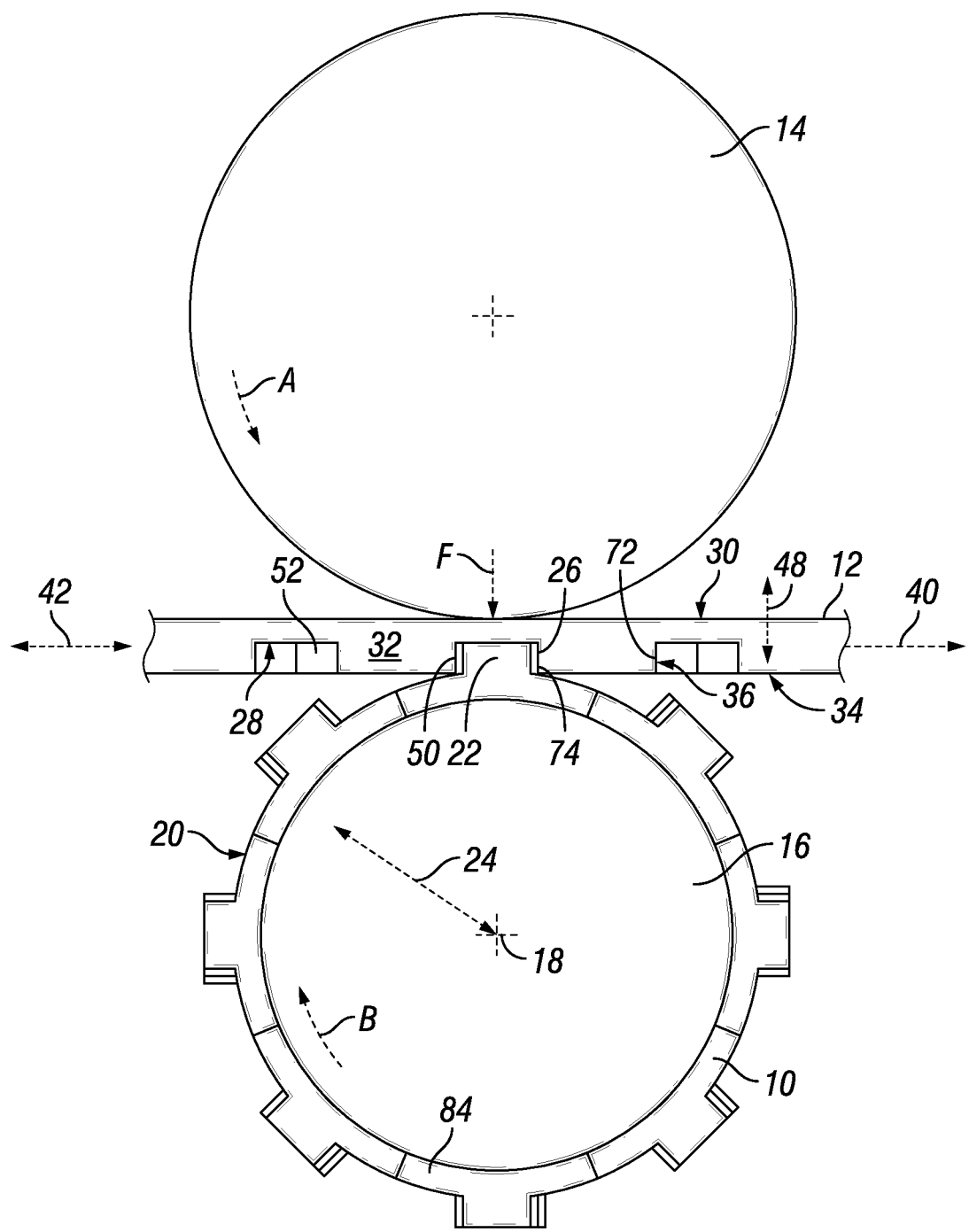
FIG. 7 is a side view of a brush, tread and sculptured drum during a brushing process.

FIG. 7 shows the tread 12 being brushed by the brush 14 in a brushing process. The underside surface 30 of the tread 12 is engaged by the brush 14 and is brushed to cause the underside surface 30 to assume a desired finish for subsequent processing in the retreading process. The portion of the tread 12 opposite the portion of the underside surface 30 engaged by the brush 14 is supported by the sculptured drum 10. The sculptured drum 10 and the brush 14 may thus form a nip through which the tread 12 is passed during processing. The tread 12 moves in a machine direction 40 past the sculptured drum 10 and the brush 14 which is also oriented in the longitudinal direction 42 of the tread 12. The support member 22 is disposed within one of the groove 26 of the tread 12 which is a lateral groove 52 as shown. The support member 22 engages the lower surface 28 of the tread 12 so that when the brush 14 applies the force F to the tread 12 bending of the tread 12 does not occur. The support member 22 reinforces the groove 26 so that a thin area of the tread 12 right above the groove 26 in the vertical direction 48 does not deform during the application of force F to cause the aforementioned brushing irregularities such as the dig in notches 78 and the under brushed spots 78.

The lateral groove 52 has an open end 50, and the support member 22 is visible in the lateral groove 52. The support member 22 does not completely fill the lateral groove 52 when inserted into the lateral groove 52 but only fills a portion of its volume. When inserted, some portion of the tread block outer surface 34 will engage the drum outer surface 20. It may be the case that as the tread 12 moves past the brush 14, the tread block outer surface 34 will always be in contact with the drum outer surface 20. However, in other arrangements there will be instances of the tread block outer surface 34 moving into and out of engagement with the drum outer surface 20 so that there are some points in the brushing where no engagement takes place. In still further exemplary embodiments, there is never any engagement between the tread block outer surface 34 and the drum outer surface 20 regardless of whether the support member 22 is inserted into the groove 26 or is not inserted.

As the tread 12 moves in the machine direction 40, the brush rotates in direction A which is counterclockwise in the figure, and the sculptured drum 10 moves in the direction of arrow B which is likewise counterclockwise. The sculptured drum 10 includes 8 segments 84 that each have support members 22 that likewise rotate in direction B during finishing. The support members 22 move into the grooves 26 as the support members 22 are rotated towards the top of the sculptured drum 10, and the support members 22 are then moved out of the grooves 26 as they rotate downward from the top most position of the sculptured drum 10 which is also the position closest to the brush 14. Due to the fact that the entire volume of the lateral groove 52 is not being filled by the support member 22 when the support member 22 is within the lateral groove 52, the support member 22 will more easily enter and exit the lateral groove 52. As the support member 22 does not fill the entire volume of the lateral groove 52, the support member 22 will not engage all of the tread block walls 36 and thus friction resulting from pushing against these walls 36 will be eliminated or reduced in order to make it easier to insert and remove the support member 22. The pitch of the support members 22 about the sculptured drum 10 may be adjusted to ensure that it properly corresponds with the spacing of the grooves 26 on the tread 12 into which the support members 22 are inserted by adjusting the diameter of the sculptured drum 10 so that the radius length on the top of the grooves 26 is the same as the pitch width.

Figure 8:
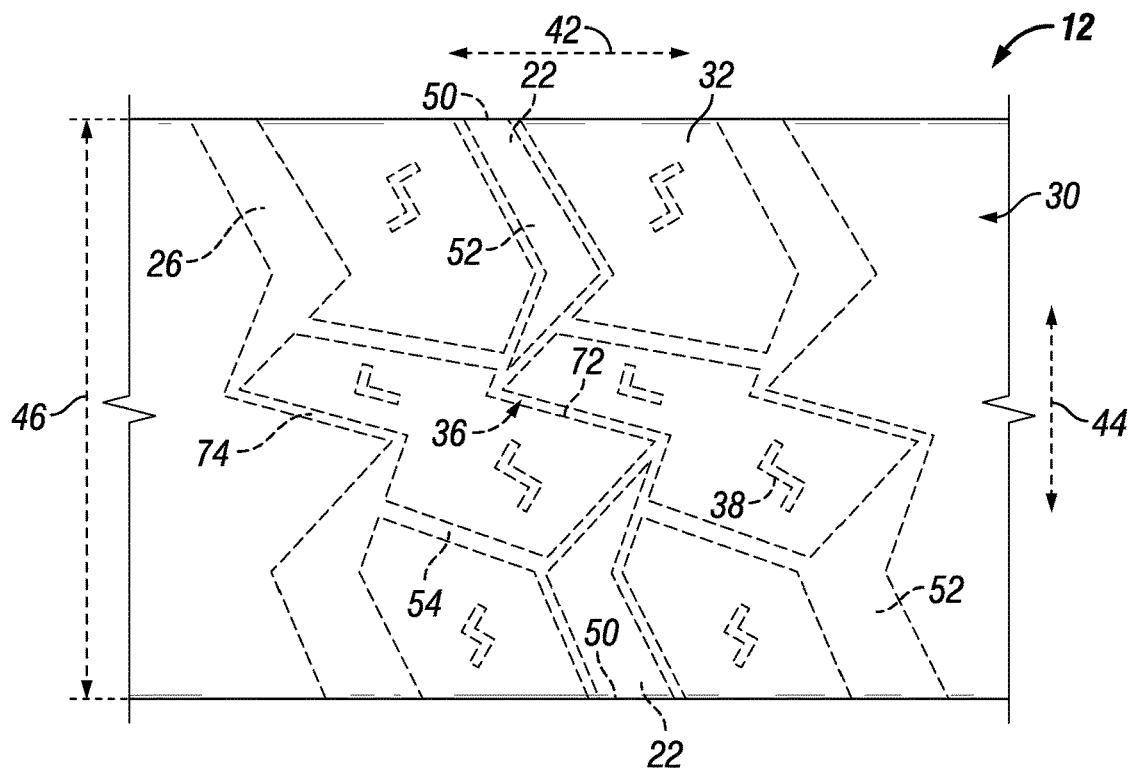
FIG. 8 is a top view of the tread of FIG. 4 with support members inserted into grooves of the tread.

FIG. 8 shows the underside surface 30 and shows a pair of support members 22 inserted into a pair of lateral grooves 52. As the tread 12 is brushed and travels in the longitudinal direction 42, none of the support members 22 enter the circumferential grooves 54 or sipes 38, but only enter the lateral grooves 52. The support members 22 do not extend along the entire width 46 of the tread 12 but instead extend only over a portion of the width 46 in the lateral direction 44. The support members 22 are located at the edges of the tread 12 in the lateral direction 44 and are not present in the interior of the tread 12 with respect to the lateral direction 44. The support members 22 do not enter and support all of the grooves 26 of the tread 12, but only the lateral grooves 52. In some arrangements, some of the lateral grooves 52 may not be supported as well. In yet other arrangements, the circumferential grooves 74 can be supported by the support members 22 but not the lateral grooves 52 or sipes 38. In yet other arrangements, both the lateral grooves 52 and circumferential grooves 54 may be supported either totally or in some combination.

The grooves 26 that are supported may be the largest grooves 26 of the tread 12. The size of the grooves 26 may be determined based on volume of the grooves 26, and in the exemplary embodiment shown the lateral grooves 52 are larger than the circumferential grooves 54. The largest grooves 26 may be supported such that the support members 22 are only located within the largest grooves 26 of the tread 12 and there is no groove 26 into which the support members 22 are disposed that is smaller in volume than any non-supported groove 26. The grooves 26 that are selected for support may be those that boarder tread blocks 32 associated with dig in notches 76 or under brushed spots 78. As shown, the support members 22 when located into the grooves 26 are spaced from the tread block walls 36 so that the support members 22 do not engage the tread block walls 36 at any point. However, other embodiments are possible in which the support members 22 do in fact contact the tread block walls 36 at some point. The support members 22 have generally the same shape as the grooves 26 into which they are disposed, but are smaller in size. Further, the support members 22 need not be an exact duplicate of the shape of the grooves 26 but can be an approximation of the shape in which some of the features of the grooves 26 are not present in the shape of the support members 22. Supporting the larger grooves 26, or those that are associated with irregular brushing, may reduce or eliminate unwanted movement of the tread 12 during brushing to cause a more uniform brushing application of the underside surface 30.

Figure 9:
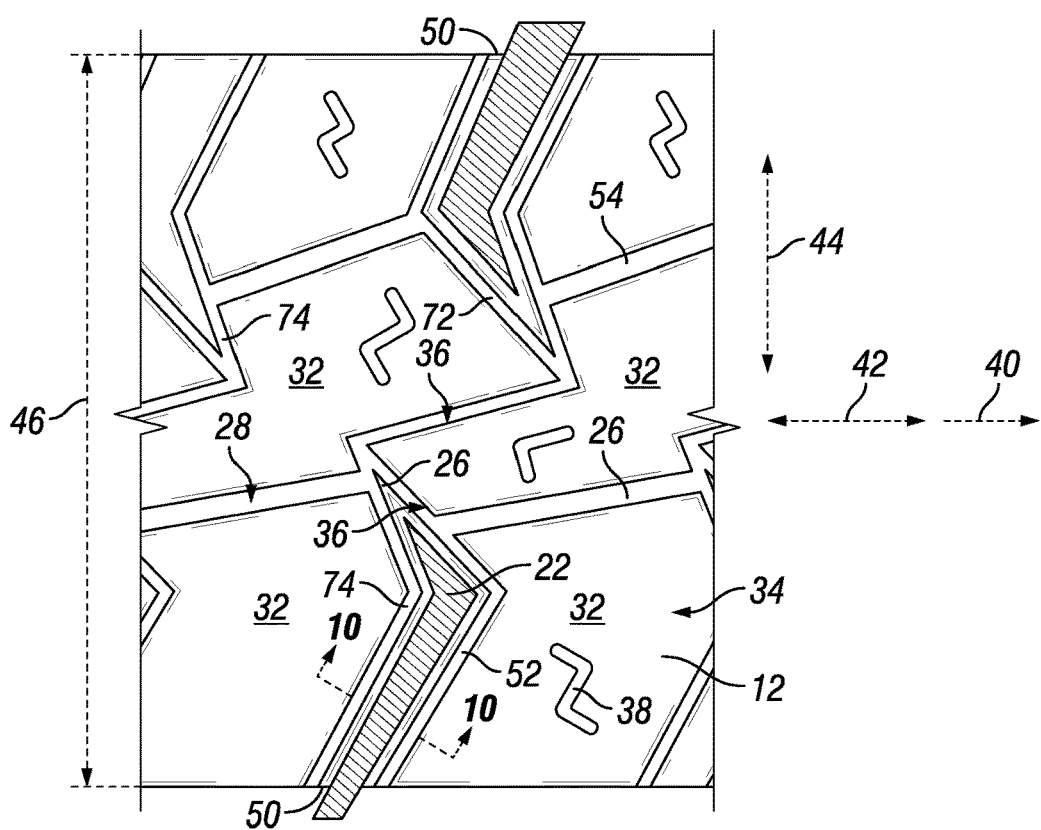
FIG. 9 is a cross-sectional view of the tread with support members disposed therein that is taken through the support members looking up at the tread surface.
Figure 10:
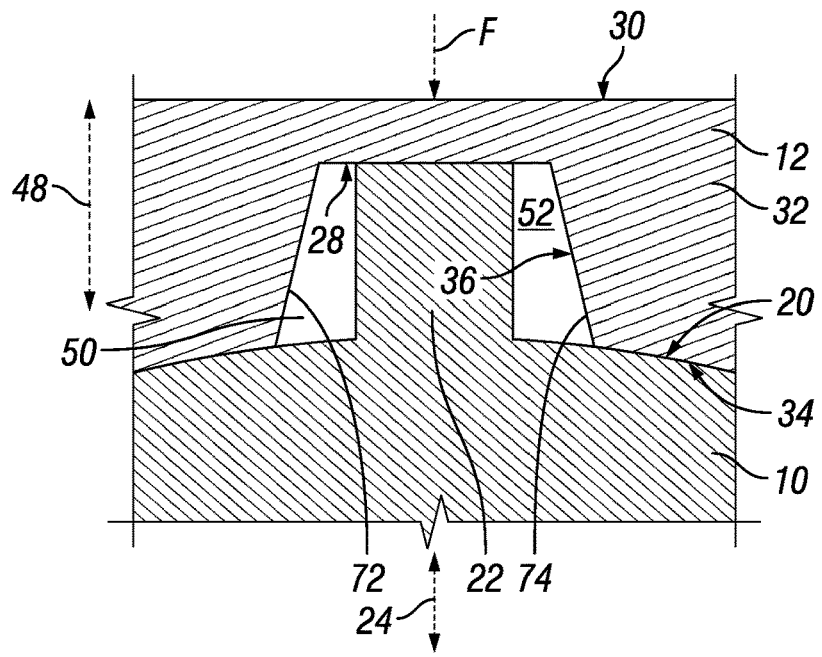
FIG. 10 is a cross-sectional view of a support member and tread taken along line 10-10 of FIG. 9.

FIG. 9 shows the tread 12 viewed from the bottom in which the tread block outer surface 34 is visible. The support members 22 are shown in cross-section and in this embodiment extend beyond both of the lateral edges of the tread 12 in the lateral direction 44. The ends 50 of the lateral grooves 52 are open and the support members 22 extend through the open ends 50 and into the lateral grooves 52. The support members 22 are spaced from the tread blocks 32 and do not engage the tread blocks 32 so that they are not in contact with the tread block walls 36, but do engage the lower surface 28. FIG. 10 is a cross-sectional view taken along line 10-10 of FIG. 9 and shows the engagement between the support member 22 and the lower surface 28 when the force F is applied and the support member 22 is disposed within the groove 26. The tread 12 at the location above the lateral groove 52 into which the support member 22 is disposed will not bend due to the presence of the support member 22. The sculptured drum 10 may reduce irregularities on the underside surface 30 by restricting the space present in the nip of the brush 14 and sculptured drum 10 while the tread 12 passes. The tread block outer surface 34 also engages the drum outer surface 20 along at least an arc length portion of the drum outer surface 20. The lateral groove 52 is defined by tread block walls 36 that are tapered in that the tread block walls 36 approach one another upon moving in the vertical direction 48 from the tread block outer surface 34 to the lower surface 28. Although the tread block walls 36 of the lateral groove 52 are tapered, there is no need to taper the side walls of the support member 22 that directly face the tread block walls 36 of the lateral groove 52 because they do not touch and do not need to be an exact mirror image of the lateral groove 52. The side walls of the support member 22 can be parallel to one another, or may extend in only a radial direction away from the central axis 18 with no component in the arc length direction around the central axis 18. As shown, the support member 22 is spaced from the tread block walls 36 so that these components are not engaged when the support member 22 is located within the tread 12.

The lateral grooves 52 are two in number and are located generally at the same location in the longitudinal direction 42 but are spaced from one another in the lateral direction 44. The lateral grooves 52 repeat in the longitudinal direction 42 so that they extend all the way across the circumferential direction 56 of the tire 80 360 degrees about the rotational axis 82. One of the lateral grooves 52 extends from the end 50 in the lateral direction 44 at some angle to the lateral direction 44 so that it has a component of extension in both the lateral direction 44 and the longitudinal direction 42. The lateral groove 52 is constant in this direction but then bends so as to move in the opposite longitudinal direction 42 but still in the same lateral direction 44. This bend may be said to have a radius. The support members 22 are shaped to match the lateral grooves 52. In this manner, the support member 22 extends in the longitudinal direction 42 and the lateral direction 44 in the same manner as the lateral groove 52 so as to be constant in extension. The support member 22 features the same bend at the same point and with the same radius the lateral groove 52 bends. The support member 22 then extends in the opposite longitudinal direction 42 but in the same lateral direction 44 in the same manner as the lateral groove 52. The lengths in the lateral direction 44 and in the longitudinal direction 42 of the support member 22 are both less than the lateral and longitudinal lengths of the groove 26 into which the support member 22 is disposed in the lateral direction 44 and the longitudinal direction 42.

Figure 11:
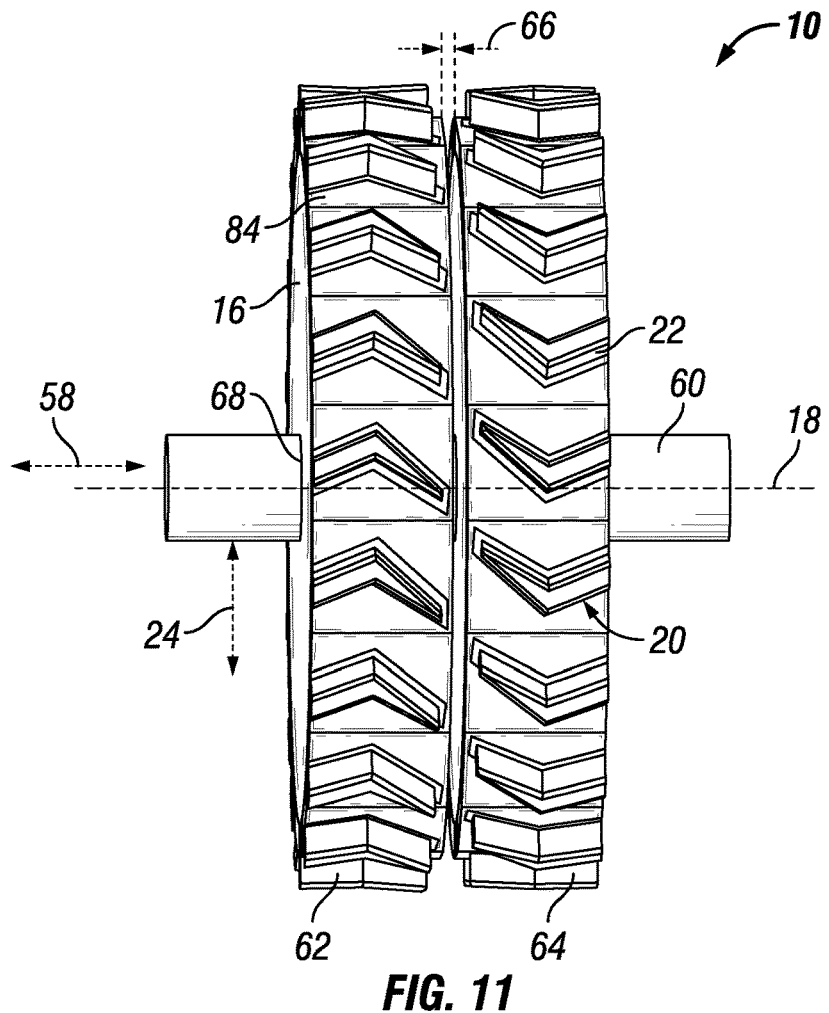
FIG. 11 is a front perspective view of a sculptured drum made up of a first component and a second component in accordance with one exemplary embodiment.

FIG. 11 shows another embodiment of the sculptured drum 10 that is made up of a first component 62 and a second component 64. Each one of the components 62, 64 includes support members 22 and have an inner radial section 16. The components 62, 64 are mounted onto a shaft 60 and can be slid along the shaft 60 to a desired position into which they are fixedly attached. Rotation of the shaft 60 causes both of the components 62, 64 to likewise rotate as they are all attached as a rigid body. By making the sculptured drum 10 as a set of components 62, 64 the width of the sculptured drum 10 in the axial direction 58 can be adjusted so that the same sculptured drum 10 can be used to support tread 12 having different widths 46. The distance 66 between the first component 62 and the second component 64 may be adjusted as desired so that the first and second components 62, 64 are spaced any desired distance 66 from one another to be properly positioned for supporting the tread 12. The first and second components 62, 64 may also be moved against one another in the axial direction 58 so that the distance 66 is 0 if desired. Adjustment of the distance 66 may allow the sculptured drum 10 to be used with treads 12 of different widths 46 so that less tooling and manufacturing costs are incurred.

Since the support members 22 do not need to exactly match the profile and size of the grooves 26, but must have a smaller footprint than the grooves 26, and since the support members 22 do not need to be inserted into every groove 26 of the tread 12, the same sculptured drum 10 can be used for supporting a variety of different sized and shaped treads 12. This feature of the process reduces the necessary tooling and reduces the need to change tooling.

The sculptured drum 10 may be provided so that only the largest grooves 26 of the tread 12 are supported by the support members 22, while the grooves 26 that are smaller are not supported at all in that no support members 22 are inserted therein. In some instances only grooves 26 that are lateral grooves 52 with a width in the lateral direction 44 greater than 5 millimeters are supported by the support members 22 while all of the other grooves 26 of the tread 12 are not supported and do not have any support members 22 disposed within. In certain embodiments, only the lower surface 28 of the groove 26 is engaged and supported by the support member 22 while the sides of the groove 26 formed by the tread block walls 36 are not engaged or supported by the support member 22. The disclosed process in some arrangements may only focus on reducing or eliminating brushing irregularities associated with the underside surface 30 opposite the large grooves 26 and may not reduce brushing irregularities associated with other portions of the underside surface 30. However, in a retread finishing line multiple brushing heads may be present and can be used to tread areas of the underside surface 30 that are not treated by the presently disclosed brush 14 and sculpture drum 10.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed is:

1. A sculptured drum for a retread process, comprising:
   an inner radial section that has a central axis, wherein the central axis extends in an axial direction;
   a drum outer surface;
   a plurality of support members that extend outward from the drum outer surface in a radial direction of the sculptured drum, wherein the support members are located outward from the inner radial section in the radial direction;
   wherein the sculptured drum is configured for supporting a tread that has a plurality of grooves, wherein the tread is configured such that some but not all of the grooves are configured for having one of the support members disposed therein, wherein the support members are configured for not completely filling the grooves, wherein the support members are configured for engaging a lower surface of the tread;
   wherein every one of the individual support members has a length in the axial direction that is less than the length of the drum outer surface in the axial direction.

2. The sculptured drum as set forth in claim 1, wherein the tread has a plurality of tread blocks that have tread block outer surfaces and tread block walls, wherein the grooves into which the support members are disposed are defined by the lower surface of the tread and the tread block walls, wherein the support members when disposed within the grooves do not engage the tread block walls.

3. The sculptured drum as set forth in claim 2, wherein the tread block outer surfaces engage the drum outer surface.

4. The sculptured drum as set forth in claim 1, wherein the grooves into which the support members are disposed are the largest grooves of the tread.

5. The sculptured drum as set forth in claim 1, wherein some of the grooves of the tread are sipes, wherein the support members are not disposed within any of the sipes, wherein the lower surface of the tread is located farther from the central axis in the radial direction than the sipes are located to the central axis in the radial direction.

6. The sculptured drum as set forth in claim 1, wherein the tread has a machine direction that is the direction the tread is passed across the sculptured drum, wherein the tread has a longitudinal direction that extends in the machine direction, wherein the tread has a lateral direction that extends along a width of the tread, wherein the tread has a vertical direction, wherein the grooves into which the support members are disposed have at least one end in the lateral direction that is open.

7. The sculptured drum as set forth in claim 1, wherein all of the grooves into which the support members are disposed are lateral grooves that extend in a lateral direction of the tread, wherein at least some of the grooves into which the support members are not disposed are circumferential grooves that extend in a circumferential direction of a tire into which the tread is incorporated.

8. The sculptured drum as set forth in claim 7, wherein the lateral grooves into which the support members are disposed extend at least 5 millimeters in the lateral direction.

9. The sculptured drum as set forth in claim 1, further comprising a shaft onto which the inner radial section is disposed, wherein the position of the inner radial section is adjustable along the shaft in the axial direction.

10. A sculptured drum for a retread process, comprising:
    an inner radial section that has a central axis, wherein the central axis extends in an axial direction;
    a drum outer surface;
    a plurality of support members that extend outward from the drum outer surface in a radial direction of the sculptured drum, wherein the support members are located outward from the inner radial section in the radial direction;
    wherein the sculptured drum is configured for supporting a tread that has a plurality of grooves, wherein the tread is configured such that some but not all of the grooves are configured for having one of the support members disposed therein, wherein the support members are configured for not completely filling the grooves, wherein the support members are configured for engaging a lower surface of the tread;
    wherein the inner radial section, the drum outer surface, and the plurality of support members are arranged into a first component and a second component that are separate from one another, wherein the distance from the first component to the second component is adjustable in the axial direction.

11. The sculptured drum as set forth in claim 1, wherein the inner radial section is a solid member with a through hole located at the central axis.

12. A sculptured drum for a retread process, comprising:
    an inner radial section that has a central axis, wherein the central axis extends in an axial direction;
    a drum outer surface;
    a plurality of support members that extend outward from the drum outer surface in a radial direction of the sculptured drum, wherein the support members are located outward from the inner radial section in the radial direction;
    wherein the sculptured drum is configured for supporting a tread that has a plurality of grooves, wherein the support members are configured for being disposed within the grooves such that none of the grooves are configured for being completely filled by the support members;
    wherein every one of the individual support members has a length in the axial direction that is less than the length of the drum outer surface in the axial direction.

* * * * *